US007342907B2

(12) United States Patent
Kim et al.

(10) Patent No.: US 7,342,907 B2
(45) Date of Patent: Mar. 11, 2008

(54) METHOD FOR CONTROLLING UNIDIRECTIONAL LINK CONNECTION IN MOBILE AD HOC NETWORKS AND RECORDING MEDIUM STORING PROGRAM THEREOF

(75) Inventors: Jae-Ho Kim, Kumi (KR); Sung-Hee Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 1001 days.

(21) Appl. No.: 10/410,739

(22) Filed: Apr. 10, 2003

(65) Prior Publication Data
US 2004/0120263 A1 Jun. 24, 2004

(30) Foreign Application Priority Data
Dec. 23, 2002 (KR) .................. 10-2002-0082860

(51) Int. Cl.
H04Q 7/24 (2006.01)
H04J 3/16 (2006.01)
H04B 7/185 (2006.01)
H04L 12/413 (2006.01)

(52) U.S. Cl. .................. 370/338; 370/469; 370/448; 370/318

(58) Field of Classification Search ................ 370/318, 370/330, 331, 332, 351, 338, 392; 455/517, 455/518, 13.4, 404.2, 436, 452.2, 41.2
See application file for complete search history.

(56) References Cited
U.S. PATENT DOCUMENTS
6,697,649 B1 * 2/2004 Bennett et al. ............. 455/574
6,735,448 B1 * 5/2004 Krishnamurthy et al. ... 455/522

FOREIGN PATENT DOCUMENTS
KR 1020010047070 6/2001
WO WO 02/41521 A2 5/2002

OTHER PUBLICATIONS
2000 IEEE, "A Tunneling Approach To Routing with Unidirectional Links in Mobile Ad-Hoc Networks", s. Nesargi, et al., 6 pages.

* cited by examiner

Primary Examiner—Hanh Nguyen
(74) Attorney, Agent, or Firm—Blakely Sokoloff Taylor & Zafman

(57) ABSTRACT

Disclosed is a method for controlling unidirectional link connection in a mobile ad hoc network which comprises: mobile nodes including transmission power information in a beacon message that is periodically transmitted; using the information to sense a unidirectional link and maintain residual power information with regard to the corresponding node, and providing unidirectional link connectivity in the link layer to an upper layer through a filtering process using broadcasting and residual power information. Hence, the unidirectional links generated in the mobile ad hoc network may be accurately sensed using transmission power loss on a transmission path, and the frames generated in the link layer in the reverse direction of the unidirectional links may be transmitted.

11 Claims, 4 Drawing Sheets

METHOD FOR CONTROLLING UNIDIRECTIONAL LINK CONNECTION IN MOBILE AD HOC NETWORKS AND RECORDING MEDIUM STORING PROGRAM THEREOF

CROSS REFERENCE TO RELATED APPLICATION

This application is based on Korea Patent Application No. 2002-82860 filed on Dec. 23, 2002 in the Korean Intellectual Property Office, the content of which is incorporated herein by reference.

BACKGROUND OF THE INVENTION (a) Field of the Invention

The present invention relates to a method for controlling unidirectional link connection in a mobile ad hoc network, and a recording medium storing a program thereof. More specifically, the present invention relates to a method for controlling unidirectional link connection in a mobile ad hoc network, and a recording medium storing a program thereof for detecting unidirectional links generated by a transmission power difference, and providing connectivity of a unidirectional link to an upper layer.

(b) Description of the Related Art

Ad hoc networks represent networks with only mobile terminals, designed in the assumption that most wireless MAC (medium access control) protocols have identical transmission power at all mobile nodes.

However, the actual ad hoc network includes various devices categorized as battery-based personal portable devices, and devices that are supplied with optimal power from their power source. The personal portable devices include a notebook computer, a PDA, and a mobile phone, and the devices receiving optimal power include mobile communication devices attached to tanks, helicopters, armored motorcars, fire engines, and ambulances.

The devices have different transmission powers because of differences in power supplied to the devices and differences in size of the devices because of portability, which generates unidirectional links. Here, a unidirectional link may be generated between a high transmission power node and a low transmission power node, wherein data is only transmitted from the high transmission power node to the low transmission power node.

So as to utilize the unidirectional link, the low transmission power node conventionally senses the unidirectional link, and a frame that approaches a start mobile node of the unidirectional link is tunneled using a routing function of a network layer.

A method for sensing the unidirectional link according to prior art enables each mobile node to hold a neighbor node list of the neighboring nodes that are adjacent to the mobile node, load the neighboring node list into the 'Hello' message that is periodically broadcasted to adjacent neighboring nodes, and transmit the message to the adjacent neighboring nodes.

In this instance, when the 'Hello' message is transmitted between two mobile nodes in the unidirectional link relation, the neighboring node list in the 'Hello' message of the high transmission power node includes no low transmission power nodes.

Therefore, the low transmission power node is required to receive the 'Hello' message and detect a unidirectional link. The low transmission power node uses information collected by a routing protocol to tunnel an ACK of a link layer from an end point of the unidirectional link to the packet start point, and routing information of a network layer. Accordingly, the high transmission power node may transmit data using the unidirectional link.

As described above, since the prior art method for sensing the unidirectional link performs communication using the routing function of an upper layer, it delays frame transmission and generates processing overhead.

SUMMARY OF THE INVENTION

It is an object of the present invention to provide a method for controlling unidirectional link connection in an ad hoc network, and a recording medium for storing a program thereof for providing unidirectional link connectivity in the ad hoc network to an upper layer from a link layer.

In one aspect of the present invention, a method for controlling unidirectional link connection in a mobile ad hoc network comprises: (a) each mobile node sensing a unidirectional link when a unidirectional link is generated because of a difference between transmission powers, the mobile nodes forming a mobile ad hoc network; (b) relaying a frame generated in a link layer in the reverse direction of the unidirectional link when the unidirectional link is sensed in (a); and (c) removing the repeated frame relay from among the relayed frames in (b), and providing unidirectional link connectivity in the link layer to an upper layer.

Sensing a unidirectional link in (a) comprises: (i) each mobile node including transmission power and minimum receipt power information in the frame and periodically transmitting them; (ii) receiving the frame transmitted in (i), and calculating path loss power on a transmission path and residual power; and (iii) sensing a unidirectional link when transmission power is less than the summation of the path loss power calculated in (ii) and the minimum receipt power.

An address field of the frame transmitted in (i) includes a start address, a destination address, a recipient address, and a transmitter address.

In the address field of the frame, the start address includes a mobile node with low transmission power, the destination address includes a mobile node with high transmission power, the recipient address includes a broadcast address, and the transmitter address includes an address of a mobile node for transmitting the corresponding frame.

In another aspect of the present invention, a recording medium stores a program including functions comprising: each mobile node sensing a unidirectional link when a unidirectional link is generated because of a difference between transmission powers, the mobile nodes forming a mobile ad hoc network; relaying a frame generated in a link layer in the reverse direction of the unidirectional link when the unidirectional link is sensed; and removing the repeated frame relay from among the relayed frames, and providing unidirectional link connectivity in the link layer to an upper layer.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
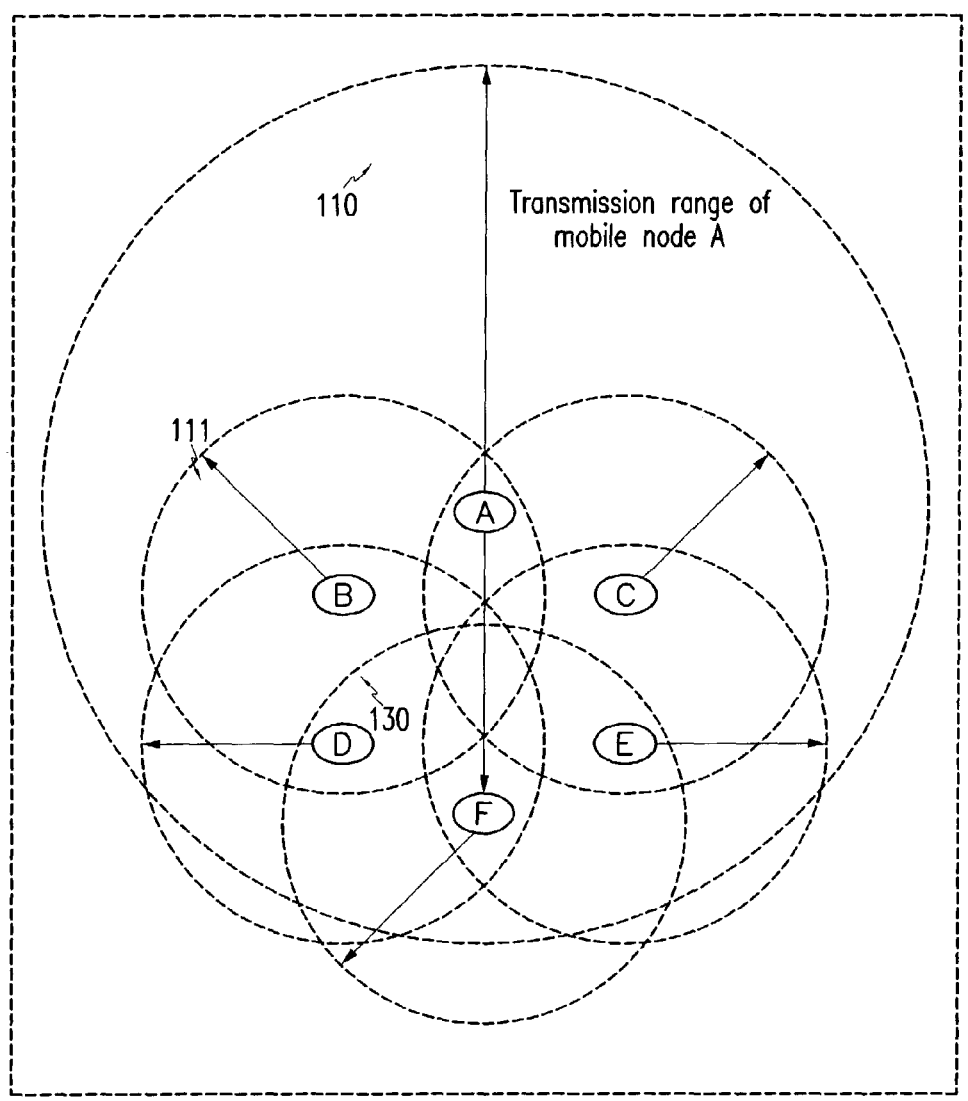
FIG. 1 shows a mobile ad hoc network for generating a unidirectional link caused by a transmission power difference.

FIG. 1 shows a mobile ad hoc network for generating a unidirectional link caused by a transmission power difference.

As shown, a unidirectional link 130 is generated because of a difference between a transmission range 110 of a mobile node A and a transmission range 111 of other mobile nodes B through F.

In this instance, the mobile node A may transmit frames to the mobile node F, but the mobile node F is not able to transmit frames directly to the mobile node A.

Figure 2:
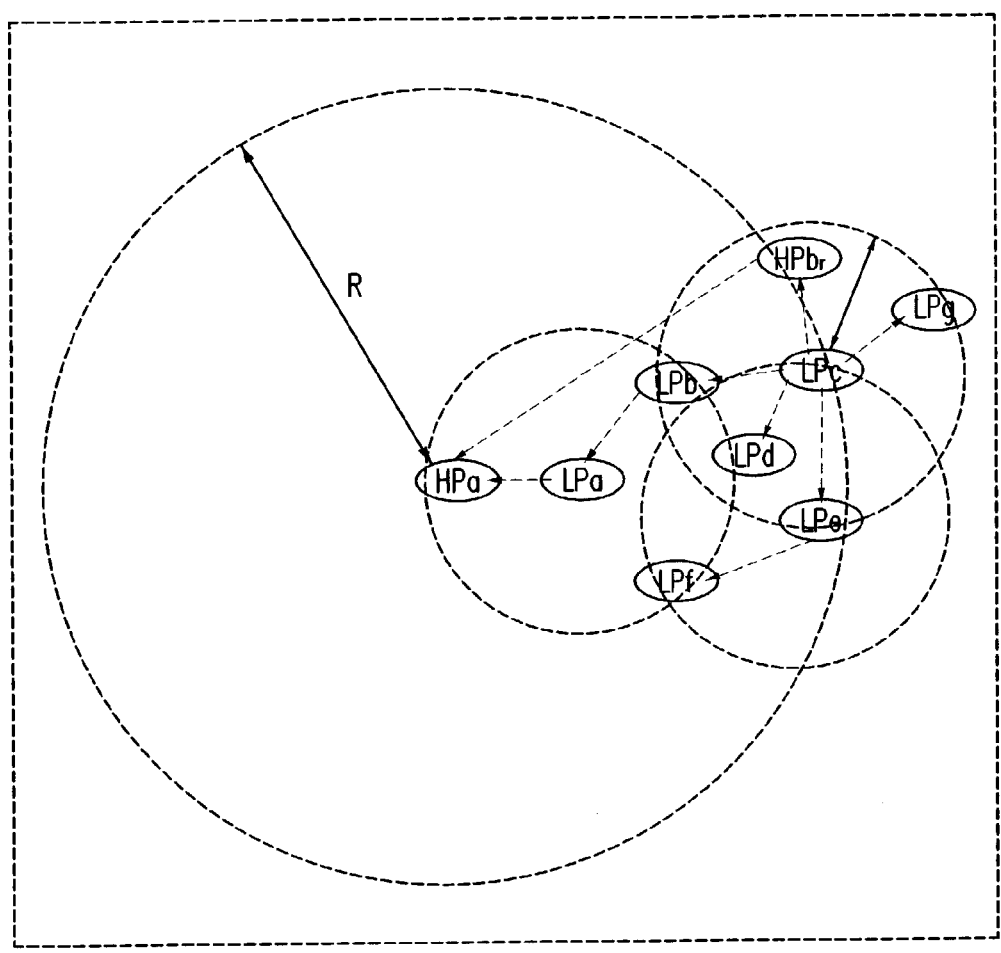
FIG. 2 shows a process for transmitting a frame in the reverse direction of the unidirectional link generated in FIG. 1.

FIG. 2 shows a process for transmitting a frame in the reverse direction of the unidirectional link generated in FIG. 1.

Referring to FIG. 2, mobile nodes HPa and HPb with high transmission powers each have a transmission range R, and mobile nodes LPa through LPg with low transmission powers each have a transmission range r.

As shown in FIG. 2, a unidirectional link is generated between the mobile nodes HPa and LPc, and the frame transmitted to HPa from LPc is applied to all mobile nodes within the transmission range of LPc.

After receiving the frame from LPc, each mobile node processes the frame to send it on a path to HPa when the frame is transmitted in the reverse direction of the unidirectional link.

In the above, the frame transmitted by the LPc is transmitted to the destination HPa in a converged format. If the mobile node HPb is provided, the transmission path of the frame is in the order of LPc, HPb, and HPa; and if HPb is not provided, the transmission path is in the order of LPc, LPb, Lpa, and HPa.

Figure 3:
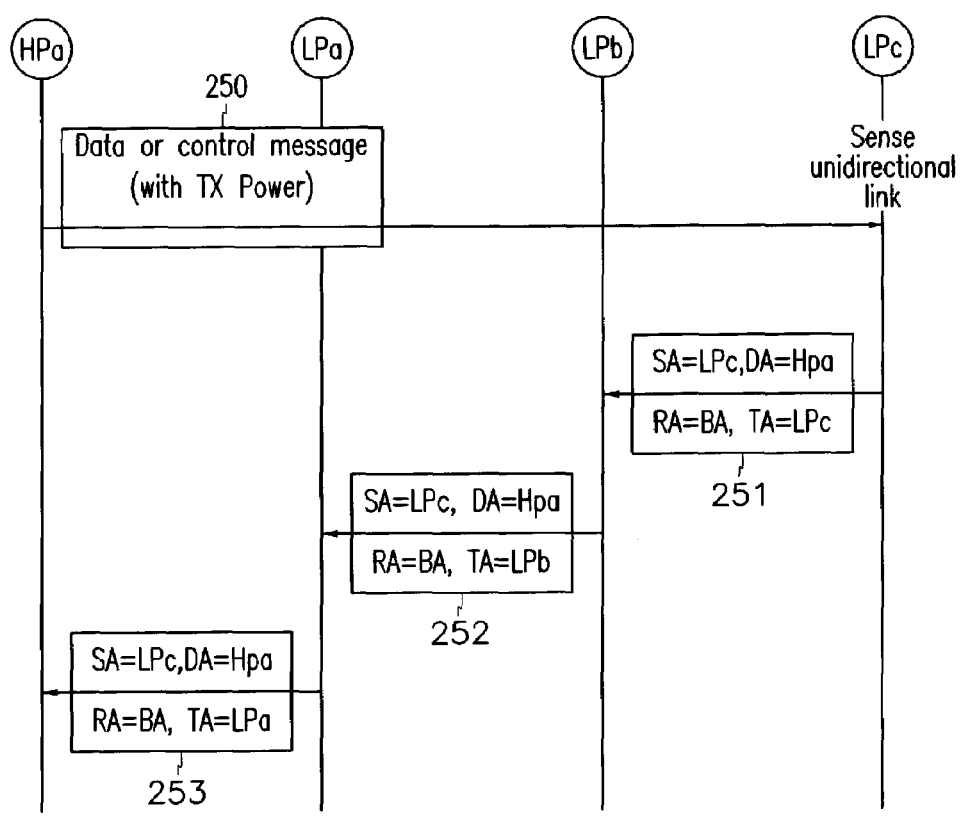
FIG. 3 shows an address field variation process of a frame when the frame is transmitted in the reverse direction of the unidirectional link in a method for controlling the unidirectional link connection in a mobile ad hoc network according to a preferred embodiment of the present invention.

FIG. 3 shows an address field variation process of a frame when the frame is transmitted in the reverse direction of the unidirectional link in a method for controlling the unidirectional link connection in a mobile ad hoc network according to a preferred embodiment of the present invention.

FIG. 3 shows an address field variation process of the frame when the frame is transmitted through the path in order of LPc, LPb, LPa, and HPa in the case HPb is not provided.

When the mobile node HPa transmits data or a control message 250 together with transmission TX power to the mobile node LPc, LPc senses a unidirectional link because of a transmission power difference between LPc and HPa.

In an address field 251 of the frame transmitted to LPb from LPc, a start address (SA) is LPc, a destination address (DA) is HPa, a recipient address (RA) is a broadcast address (BA), and a transmitter address (TA) is LPc when the frame is transmitted through the path in order of LPc, LPb, LPa, and HPa.

In this instance, the SA and the DA are not modified during frame transmission, the RA is always set as the BA, and the TA is set as an address of a mobile node transmitting the corresponding frame.

Therefore, an address field 252 of the frame transmitted to LPa from LPb and an address field 253 of the frame transmitted to HPa from LPa have identical SA, DA, and RA, and TA is respectively modified to LPb and LPa.

Figure 4:
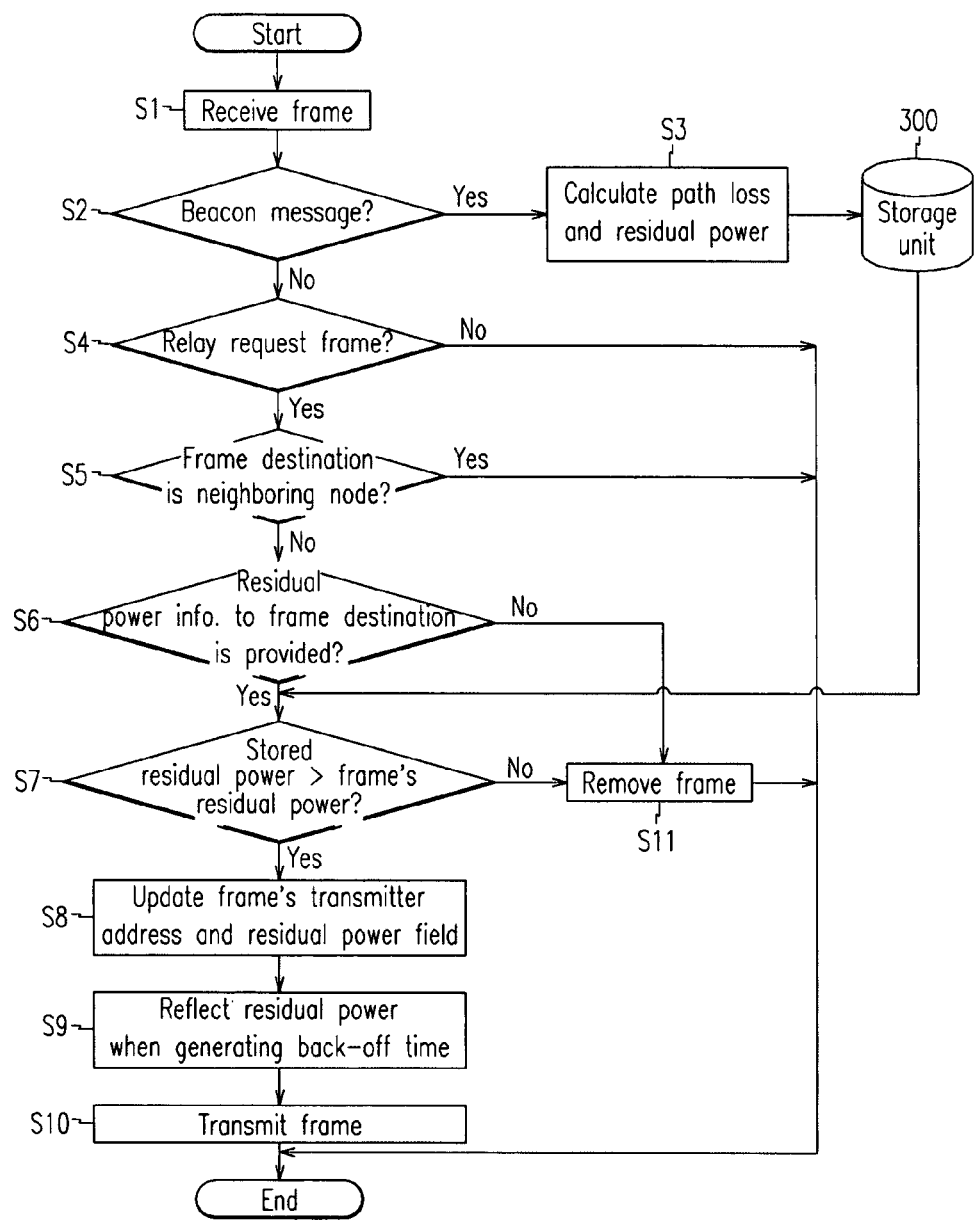
FIG. 4 shows a flowchart of the method for controlling the unidirectional link connection in a mobile ad hoc network according to a preferred embodiment of the present invention.

FIG. 4 shows a flowchart of the method for controlling the unidirectional link connection in a mobile ad hoc network according to a preferred embodiment of the present invention.

As shown, a corresponding frame is received in step S1 when an RA of the frame transmitted by each mobile node is a BA or an address of the corresponding mobile node. When receiving a beacon message including transmission power and minimum receipt power after receiving the above-noted frame, the mobile node calculates an SA of the frame, transmission path loss of a generated link, and residual power, and adds the calculation results to a storage unit 300 and updates the same in steps S2 and S3.

A mobile node uses transmission power information included in the beacon message to sense a unidirectional link and to maintain residual power information to a corresponding mobile node. That is, the mobile node senses it to be a unidirectional link when the transmission power is less than the summation of path loss power and minimum receipt power.

The storage unit 300 stores added and updated information in a software format and deletes it when a predetermined time period has passed.

When not receiving a beacon message, the mobile node determines in steps S2 and S4 whether a relay request field is set in the frame. When the relay request field is set in the frame, the mobile node determines in step S5 whether the destination of the frame is included in the neighboring node list.

When the relay request frame is not set in the frame, or the destination of the frame is included in the neighboring node list, the mobile node performs a process identical with that of the frame, and terminates the corresponding process.

When the relay request frame is set in the frame, and the destination is not included in the neighboring node list, the mobile node determines in steps S5 and S6 whether residual power information with regard to the destination of the frame is provided.

In the above, when the residual power information is provided, the mobile node determines in step S7 whether stored residual power is greater than the residual power included in the corresponding frame.

When the stored residual power is greater than the residual power included in the corresponding frame, the mobile node updates the frame's TA field and residual power information in step S8.

The case for LPb to receive the frame transmitted by LPc as shown in FIG. 2 is described as an exemplified case for updating the frame's TA field and residual power information in the previous step S8.

When the frame's TA field and residual power information is updated, the mobile node reflects residual power information to a generation of back-off time before transmitting the corresponding frame in step S9.

Hence, the mobile node transmits the frame so as to relay the frame to a mobile node that may closely transmit the corresponding frame to the destination of the frame in the shortest time in step S10.

When residual power information with regard to the frame's destination is not provided, or the residual power stored in the mobile node is less than the residual power in the frame, the corresponding frame is deleted in step S11, thereby removing the frame repeated because of failing to sense a unidirectional link, and minimizing transmission power loss.

The case for LPd to receive the frame relayed by LPa during relaying of the corresponding frame when LPg receives the frame transmitted to HPa by LPc as shown in FIG. 2 is provided as an exemplary case for deleting the repeated frame in the previous step S11.

According to the method for controlling unidirectional link connection in a mobile ad hoc network, and a recording medium storing a program thereof, the unidirectional links generated in the mobile ad hoc network are accurately sensed by using transmission power loss on the transmission path.

Also, the method for controlling unidirectional link connection in a mobile ad hoc network, and a recording medium storing a program thereof may transmit frames generated in the link layer in the reverse direction of the unidirectional link, remove repeated frames wasted because of failing to sense the unidirectional links in the prior art, and solve inefficient resource usage problems caused by link failure even when the unidirectional link is generated.

Further, since the method for controlling unidirectional link connection in a mobile ad hoc network, and a recording medium storing a program thereof independently provide unidirectional link connectivity to an upper layer from the link layer, it is not affected by the upper layer.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for controlling a unidirectional link connection in a mobile ad hoc network formed by a plurality of mobile nodes comprising:
  (a) each mobile node sensing the unidirectional link when the unidirectional link is generated because of a difference between transmission powers;
  (b) relaying frames generated in a link layer in the reverse direction of the unidirectional link when the unidirectional link is sensed in (a); and
  (c) removing a repeated frame from among the relayed frames in (b), and providing unidirectional link connectivity in the link layer to an upper layer through a filtering process using broadcasting and residual power information,
  wherein said providing unidirectional link connectivity comprises:
  comparing the residual power information included in the repeated frame with the residual power information calculated at each mobile node, and when the residual power information of the mobile node is greater than the residual power information in the repeated frame, allowing the repeated frame to reflect the residual power information to a generation of back-off time so that the mobile node with high residual power relays the corresponding frame in advance.

2. The method of claim 1, wherein said sensing a unidirectional link in (a) comprises:
  (i) for each mobile node, including a transmission power and a minimum receipt power information in a beacon message and periodically transmitting the beacon message;
  (ii) receiving the beacon message transmitted in (i), and calculating a path loss power generated on a transmission path, and a residual power; and
  (iii) sensing the unidirectional link when the transmission power is less than the summation of the path loss powers calculated in (ii) and the minimum receipt power.

3. The method of claim 2, wherein calculating the transmission path loss and the residual power in (ii) comprises adding the calculated transmission path loss and the residual power into a storage unit or updating the storage unit if the transmission path loss or the residual power information already exists.

4. The method of claim 3, wherein information on the added and updated transmission path loss and the residual power is stored in a software format, and deleted when a predetermined time period has passed.

5. The method of claim 1, wherein an address field of the relayed frame transmitted in (b) includes a start address, a destination address, a recipient address, and a transmitter address.

6. The method of claim 5, wherein, in the address field of the relayed frame, the start address includes an address of a mobile node with low transmission power, the destination address includes an address of a mobile node with high transmission power, the recipient address includes a broadcast address, and the transmitter address includes an address of a mobile node transmitting the corresponding frame.

7. The method of claim 5, wherein, in the address field of the relayed frame, the start address and the destination address are not modified before relayed frame transmission.

8. The method of claim 1, wherein said relaying the frame in the reverse direction of the unidirectional link in (b) comprises setting a residual power information and a relay request field in the relayed frame.

9. The method of claim 8, wherein a general frame processing method is performed when no relay request field is set in the relayed frame or the destination of the relayed frame is included in a neighboring node list in (b).

10. The method of claim 1, wherein said removing the repeated frame in (c) comprises: comparing the residual power information included in the repeated frame with the residual power information calculated at each mobile node, and when the residual power information of the mobile node is less than the residual power information in the repeated frame, removing the corresponding frame.

11. A machine readable medium storing program instructions which when executed cause a machine to perform a set of operations including functions comprising:
  for each of a plurality of mobile nodes, sensing a unidirectional link when the unidirectional link is generated because of a difference between transmission powers, the plurality of mobile nodes forming a mobile ad hoc network;

relaying frames generated in a link layer in the reverse direction of the unidirectional link when the unidirectional link is sensed; and removing a repeated frame from among the relayed frames, and providing unidirectional link connectivity in the link layer to an upper layer through a filtering process using broadcasting and residual power information, wherein said providing unidirectional link connectivity comprises:

comparing the residual power information included in the repeated frame with the residual power information calculated at each mobile node, and when the residual power information of the mobile node is greater than the residual power information in the repeated frame, allowing the repeated frame to reflect the residual power information to a generation of back-off time so that the mobile node with high residual power relays the corresponding frame in advance.

* * * * *